US008688626B2

(12) United States Patent
Marrelli et al.

(10) Patent No.: US 8,688,626 B2
(45) Date of Patent: Apr. 1, 2014

(54) SOFTWARE TOOL FOR GENERATING TECHNICAL BUSINESS DATA REQUIREMENTS

(75) Inventors: Carl Michael Marrelli, Westerville, OH (US); Ram S Narayanan, Canton, MI (US); Martin Oberhofer, Bondorf (DE); Solmaz Rashidi, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 35 days.

(21) Appl. No.: 13/014,913

(22) Filed: Jan. 27, 2011

(65) Prior Publication Data
US 2012/0197681 A1 Aug. 2, 2012

(51) Int. Cl.
*G06F 17/00* (2006.01)

(52) U.S. Cl.
USPC .............. 707/603; 707/601; 717/104

(58) Field of Classification Search
None
See application file for complete search history.

(56) References Cited

U.S. PATENT DOCUMENTS

| | | | |
|---|---|---|---|
| 6,996,566 B1 * | 2/2006 | George et al. | 1/1 |
| 7,577,934 B2 * | 8/2009 | Anonsen et al. | 717/102 |
| 7,610,575 B2 * | 10/2009 | Sproule | 717/103 |
| 7,620,637 B2 * | 11/2009 | Deck et al. | 1/1 |
| 7,730,123 B1 * | 6/2010 | Erickson et al. | 709/203 |
| 7,730,446 B2 * | 6/2010 | Anonsen et al. | 717/104 |
| 7,752,606 B2 * | 7/2010 | Savage | 717/135 |
| 7,805,510 B2 * | 9/2010 | Bansal et al. | 709/224 |
| 2002/0091702 A1 * | 7/2002 | Mullins | 707/100 |
| 2003/0131018 A1 | 7/2003 | Godoy et al. | |
| 2004/0024627 A1 * | 2/2004 | Keener | 705/7 |
| 2005/0144150 A1 * | 6/2005 | Ramamurthy et al. | 706/45 |
| 2005/0154742 A1 * | 7/2005 | Roth et al. | 707/100 |
| 2007/0038490 A1 * | 2/2007 | Joodi | 705/7 |
| 2007/0038977 A1 * | 2/2007 | Savage | 717/106 |
| 2007/0061287 A1 * | 3/2007 | Le et al. | 707/2 |
| 2007/0288890 A1 * | 12/2007 | Wells | 717/113 |
| 2008/0177593 A1 * | 7/2008 | Clayton et al. | 705/7 |
| 2008/0244517 A1 | 10/2008 | Rostoker | |
| 2008/0263503 A1 * | 10/2008 | Polly et al. | 717/100 |
| 2009/0164270 A1 * | 6/2009 | Seidman | 705/7 |

(Continued)

OTHER PUBLICATIONS

List, Beate, et al. "Process-Oriented Requirement Analysis Supporting the Data Warehouse Design Process—A Use Case Driven Approach." Proceedings of the 11th International Conference on Database and Expert Systems Applications. Springer-Verlag, London UK 2000.

(Continued)

*Primary Examiner* — Neveen Abel Jalil
*Assistant Examiner* — Tyler Torgrimson
(74) *Attorney, Agent, or Firm* — Trentice V. Bolar; John Pivnichny; Alexander Viderman

(57) ABSTRACT

A computer implemented method, system, and/or computer program product generates technical business data requirements from functional process requirements. Such method, system, and/or computer program product include data processing infrastructure. The data processing infrastructure may further include at least one data persistence component and at least one business process hierarchy. The computer implemented method, system, and/or computer program product obtain a set of technical elements concerning functional process requirements for each business process within the business process hierarchy. Such method, system, and/or computer program product classify technical elements into functional objects, link each of the functional objects to at least one process within the business process hierarchy and generate a plurality of business data roadmap templates in the data processing infrastructure. The generated business data roadmap templates are stored in the persistence component of the data processing infrastructure.

19 Claims, 9 Drawing Sheets

(56) References Cited

U.S. PATENT DOCUMENTS

| | | | |
|---|---|---|---|
| 2009/0198697 A1 | 8/2009 | Bilger et al. | |
| 2009/0319313 A1* | 12/2009 | Subash et al. | 705/7 |
| 2010/0082498 A1* | 4/2010 | Sadeghi et al. | 705/301 |
| 2010/0082696 A1 | 4/2010 | Cao et al. | |
| 2010/0106546 A1* | 4/2010 | Sproule | 705/7 |
| 2010/0131916 A1* | 5/2010 | Prigge | 717/104 |
| 2010/0153149 A1* | 6/2010 | Prigge et al. | 705/7 |
| 2010/0153150 A1* | 6/2010 | Prigge et al. | 705/7 |
| 2011/0022707 A1* | 1/2011 | Bansal et al. | 709/224 |

OTHER PUBLICATIONS

Infosys Technologies Ltd. "Linking Business Processes and Data Using TMF eTOM and SID Frameworks." Jan. 2006.

Borland. "Effective Requirements Definition and Management." White Paper. May 2009.

UN/CEFACT and Oasis. "ebXML Business Process Specification Schema Version 1.01—Business Process Project Team." May 2001.

\* cited by examiner

| | OBJECT | TECHNICAL ELEMENT | TECHNICAL ELEMENT DESCRIPTION | DATA DESIGNATION FLAG | SYSTEM |
|---|---|---|---|---|---|
| 408 | SALES ORDER | VBAK | SALES DOCUMENT HEADER DATA | T | SAP ECC |
| 408 | SALES ORDER | VBAP | SALES DOCUMENT ITEM DATA | T | SAP ECC |
| 408 | SALES ORDER | VBBE | SALES REQUIREMENTS INDIVIDUAL RECORDS | T | SAP ECC |
| 408 | SALES ORDER | VBEP | SALES DOCUMENT SCHEDULE LINE DATA | T | SAP ECC |
| 410 | CUSTOMER | KNA1 | GENERAL DATA IN CUSTOMER MASTER | M | SAP ECC |
| 410 | CUSTOMER | KNB1 | CUSTOMER MASTER (COMPANY CODE) | M | SAP ECC |
| 410 | CUSTOMER | KNVV | CUSTOMER MASTER SALES DATA | T | SAP ECC |
| 412 | MATERIAL | FAGLFLEXA | GENERAL LEDGER ACTUAL LINE ITEMS | M | SAP ECC |
| 412 | MATERIAL | MARA | GENERAL MATERIAL DATA | M | SAP ECC |
| 412 | MATERIAL | MARC | PLANT DATA FOR MATERIAL | | |

FIG. 5

SOFTWARE TOOL FOR GENERATING TECHNICAL BUSINESS DATA REQUIREMENTS

BACKGROUND OF THE INVENTION

Field of the Invention

The present invention relates to the field of application development and, more particularly, to software tools for the automated generation of technical business data requirements from functional process requirements by using associated technical data fields.

Large business transformation projects are plagued with problems that may be attributed directly to the fractious nature of both methodologies and platforms. A business transformation project is a key management initiative that attempts to align people, process, and technology of an enterprise closely with its business strategy and vision. Typical phases of a business transformation project include: project preparation, business blueprint, realization, final preparation, go live, and support. Stakeholders of a business transformation project often face operational, financial, or regulatory risk due to an inability to clearly define business process scope at the appropriate level of detail and inability to collect a sufficient amount of data requirements during the business blueprint phase. The main focus of the business blueprint phase is to develop a thorough conceptual approach for the procedures and requirements for reproducing the business processes in the system. However, understanding the current "as-is" state of a business is typically difficult because of the number and variety of information technology systems in use and customizations done to these systems by business organizations. Defining the desired "to-be" state and deciding the required steps to evolve from "as-is" to "to-be" is time-consuming, and therefore expensive.

Typically, business process teams achieve a common understanding of how the enterprise intends to run its business within by carrying out requirements-gathering workshops. Broadly put, process requirements describe the processes the developing organization must follow and the constraints that must be obeyed. In traditional business transformation projects, the scope of the transformation is defined through the creation of a Business Process Hierarchy (BPH). The BPH represents a business process model. A business process model is a model of sequence of steps, executed to achieve a business result. Business processes can be part of, triggered by, and superior to other business processes. Consequently, typically business processes can be modeled in a hierarchy. The business process hierarchy represents the scope of the project through a multi-level process decomposition.

The BPH is typically defined during the business blueprint phase as design workshops are held to define the process requirements. The process team assigned to each major process stream work with a data team throughout the business blueprint phase in order to bring data considerations into the project scope as early as possible. However, those teams often find it challenging to clearly define business process scope at the appropriate level of detail. The lack of detail can come from the lack of a solid starting point when defining the process hierarchy as well as a lack of technical understanding from the process teams charged with defining the functional process definition. Accordingly, the traditional process of defining the scope of the transformation is costly and time-consuming due to the enormous degree of human involvement.

In traditional business transformation projects, a member of the project personnel, such as a Functional Data Analyst (FDA), is aligned to each process team who actively participates in the process design workshops. The FDA is preferably a client resource who is skilled in their functional area and will grow their process-specific functional knowledge throughout the project phases. The FDA works with process teams to answer any data-related questions throughout the process workshops. The FDA's responsibilities typically include acquiring an initial set of data requirements that are captured in a business data requirements document for each sub-process during the business blueprint phase. It is an important task because an incomplete or incorrect set of functional data requirements could potentially affect the project's quality, development and implementation schedule, and ultimately, cost.

Many organizations may find it challenging assigning the FDA role to a resource who has adequate functional expertise as well as sufficient technical proficiency. During the business blueprint phase, the interactions of the projects' various process teams become extremely complex. Unfortunately, most often the FDAs across business processes have varying degrees of technical knowledge. In other words, some FDAs enter the design workshops with very limited knowledge about the data. As a result, they are often unable to consistently bridge the gap between identification of a functional requirement and a technical data element that is needed to fulfill the data gathering process. Moreover, even if FDAs possess adequate expertise, maintaining visibility of data usage and impact after the go live phase remains a challenge. Having a clear picture of the data flow from a legacy system through an Extract, Transform and Load (ETL) process, into the "to-be" system and eventually reports, is a difficult view to maintain. In some instances, it is even more difficult for a human being to understand the linkage between technical data elements and business processes.

Therefore, there is a significant need for automated software tools for bridging the gap between functional processes and technical elements.

BRIEF SUMMARY OF INVENTION

A computer implemented method, system, and/or computer program product generates technical business data requirements from functional process requirements. Such method, system, and/or computer program product include data processing infrastructure. The data processing infrastructure may further include at least one data persistence component and at least one business process hierarchy. The computer implemented method, system, and/or computer program product obtain a set of technical elements concerning functional process requirements for each business process within the business process hierarchy. Such method, system, and/or computer program product classify technical elements into functional objects, link each of the functional objects to at least one process within the business process hierarchy and generate a plurality of business data roadmap templates in the data processing infrastructure. The generated business data roadmap templates are stored in the persistence component of the data processing infrastructure.

A more complete understanding of the present invention, as well as further features and advantages of the present invention, will be obtained by reference to the following detailed description and drawings. It is to be understood that both the foregoing general description and the following detailed description are exemplary and explanatory only, and should not be considered restrictive of the scope of the invention, as described and claimed. Further, features or variations may be provided in addition to those set forth herein. For example, embodiments of the invention may be directed to various combinations and sub-combinations of the features described in the detailed description.

BRIEF DESCRIPTION OF THE SEVERAL VIEWS OF THE DRAWINGS

The accompanying drawings provide a further understanding of the invention and are incorporated in and constitute a part of this specification. The drawings illustrate various embodiments of the invention, and together with the description, serve to explain the principles of the invention. In the drawings:

FIG. 5 is an example of a table linking technical elements to functional objects;

DETAILED DESCRIPTION OF INVENTION

Figure 1:
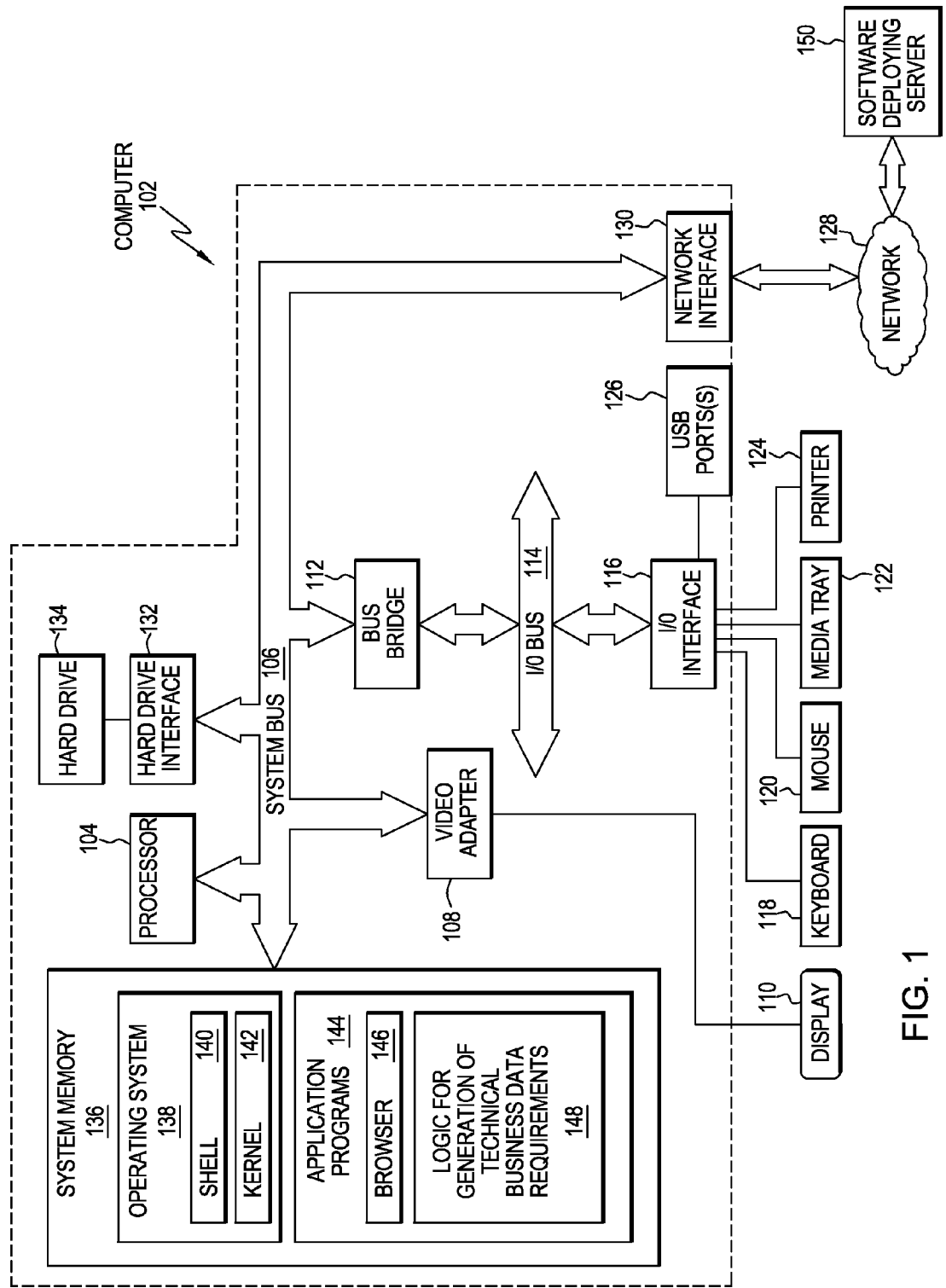
FIG. 1 depicts an exemplary computer in which the present disclosure may be implemented.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer, for example, through the Internet using an Internet Service Provider.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart, and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart, and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions, which execute on the computer or other programmable apparatus, provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices, such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network, such as the Internet, or an internal network, such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown) including, but not limited to, cache memory, registers, and buffers. Data that populates system memory 136 includes computer 102's operating system (OS) 138 and application programs 144.

OS 138 includes a shell 140, for providing transparent user access to resources, such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a logic for generation of technical business data requirements (LFGTBDR) 148. LFGTBDR 148 includes code for implementing the processes described below, including those described in FIGS. 2-9D. In one embodiment, computer 102 is able to download LFGTBDR 148 from software deploying server 150, including in an on-demand basis, wherein the code in LFGTBDR 148 is not downloaded until needed for execution to define and/or implement the improved enterprise architecture described herein. Note further that, in one embodiment of the present invention, software deploying server 150 performs all of the functions associated with the present invention (including execution of LFGTBDR 148), thus freeing computer 102 from having to use its own internal computing resources to execute LFGTBDR 148.

The hardware elements depicted in computer 102 are not intended to be exhaustive, but rather are representative to highlight essential components required by the present invention. For instance, computer 102 may include alternate memory storage devices, such as magnetic cassettes, digital versatile disks (DVDs), Bernoulli cartridges, and the like. These and other variations are intended to be within the spirit and scope of the present invention.

Figure 6:
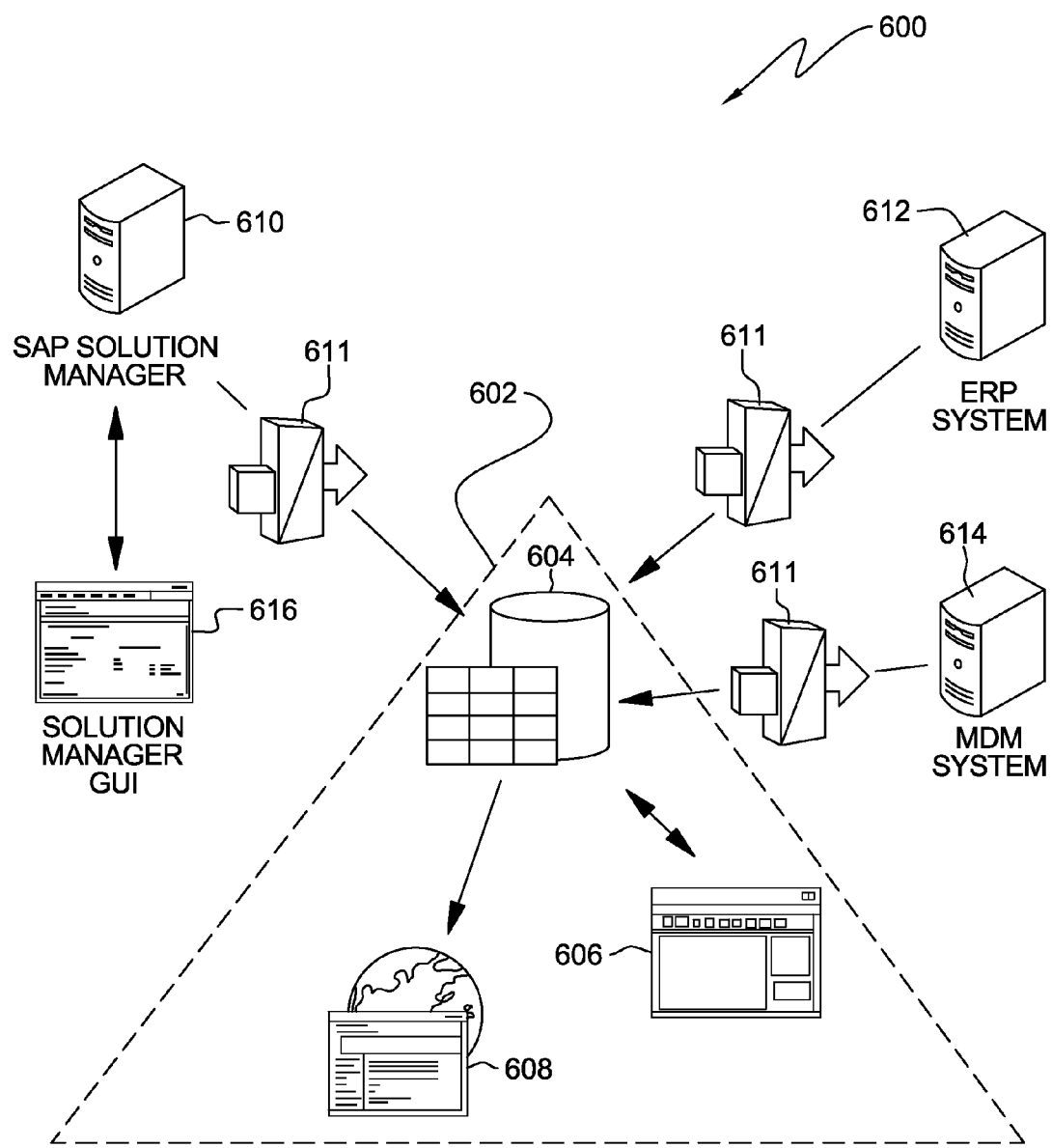
FIG. 6 shows a conceptual architecture of one embodiment of the present invention.

The present invention provides business analysts with a valuable tool to capture data requirements by process. An embodiment consistent with the invention may comprise a system for generating a Business Data Roadmap (BDR) template. FIG. 6 illustrates a conceptual architecture of one embodiment of the present invention. In the example of FIG. 6 the system 600 provides an infrastructure 602 consisting of persistency component 604, graphical user interface (GUI) 606, and report generator 608. Persistency component 604 serves as the main repository and storage for, for example, business process hierarchy, functional objects, such as sales order 408, customer 410, and material 412, extracted metadata and generated BDR templates 712, as discussed further below. Note that, in one embodiment, the persistency component 604 may comprise, for example, a database. The database may comprise a single database or multiple databases. Moreover, the database is not platform-dependent or product specific. Database technologies are well-known to one of ordinary skill in the art, and therefore require no further discussion. However, the persistency component 604 is not limited to a database implementation. For example, it may be implemented as a flat file, Extensible Markup Language (XML) document or as an enterprise content management system. Typically, an enterprise content management system stores documents, details and records related to the organizational processes of an enterprise.

Figure 3:
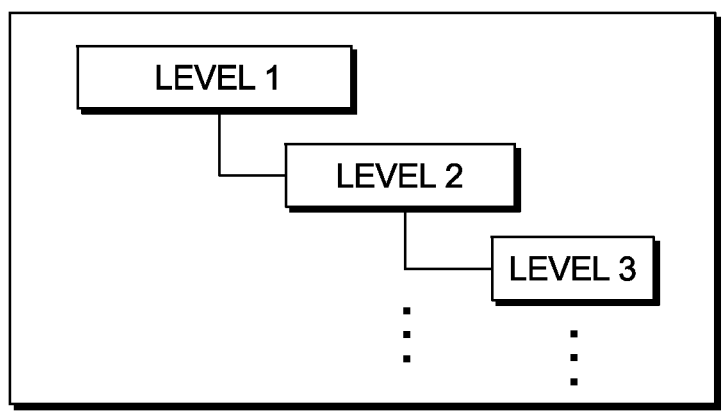
FIG. 3 illustrates an exemplary conventional business process layering in a business process hierarchy.

In one embodiment, the persistence component 604 of the infrastructure 602 may store a standard business process hierarchy (SBPH) 704. As shown in FIG. 3, a business process hierarchy typically has multiple levels. SBPH 704 provides a business transformation project team with a skeleton of a business process hierarchy to work from when defining the transformation scope. SBPH 704 typically spans all major business processes. Those of ordinary skill in the art will realize that models that could be utilized as a SBPH 704 include, for example, but not limited to, Process Classification Framework$^{SM}$ (PCF), available from American Productivity & Quality Center, Houston, Tex., or industry specific models, such as ETOM® (Enhanced Telecom Operations Map) business process framework for telecommunications industry published by the Telemanagement Forum, Morristown, N.J.

According to one or more embodiments of the invention, a GUI component 606 allows interactive, real-time data requirements capture by providing an opportunity for a user to modify the system generated BDR templates 712 during the business blueprint phase of the transformation project. Advantageously, in accordance with one or more embodiments of the invention, report generator 608 may generate reports that provide, for example, a process-centric view of data. As shown in FIG. 6, a persistence component 604 of infrastructure 602 is pre-configured to interact with other systems, such as an Enterprise Resource Planning (ERP) system (a packaged application that provides common business functions and processes) 612, Master Data Management (MDM) system 614, and SAP® Solution Manager system 610 (SAP® Solution Manager is a product of SAP AG Corporation, Walldorf, Germany), as discussed further below in conjunction with FIG. 2. Various ETL applications 611 may be used for this purpose. For example, INFOSPHERE®DATASTAGE®, commercially available from International Business Machines Corporation, Armonk, N.Y., may support the collection, integration and transformation of large volumes of data.

Figure 2:
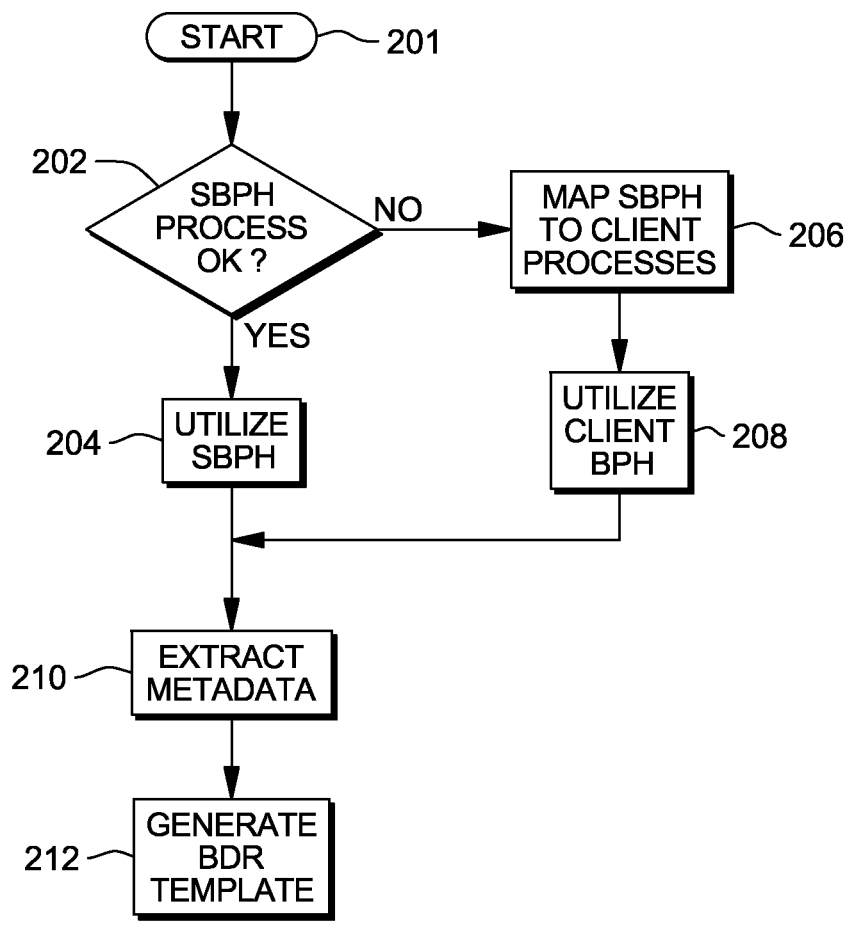
FIG. 2 is a flow chart describing an exemplary implementation of a business data roadmap template generation process incorporating features of the present invention.
Figure 7:
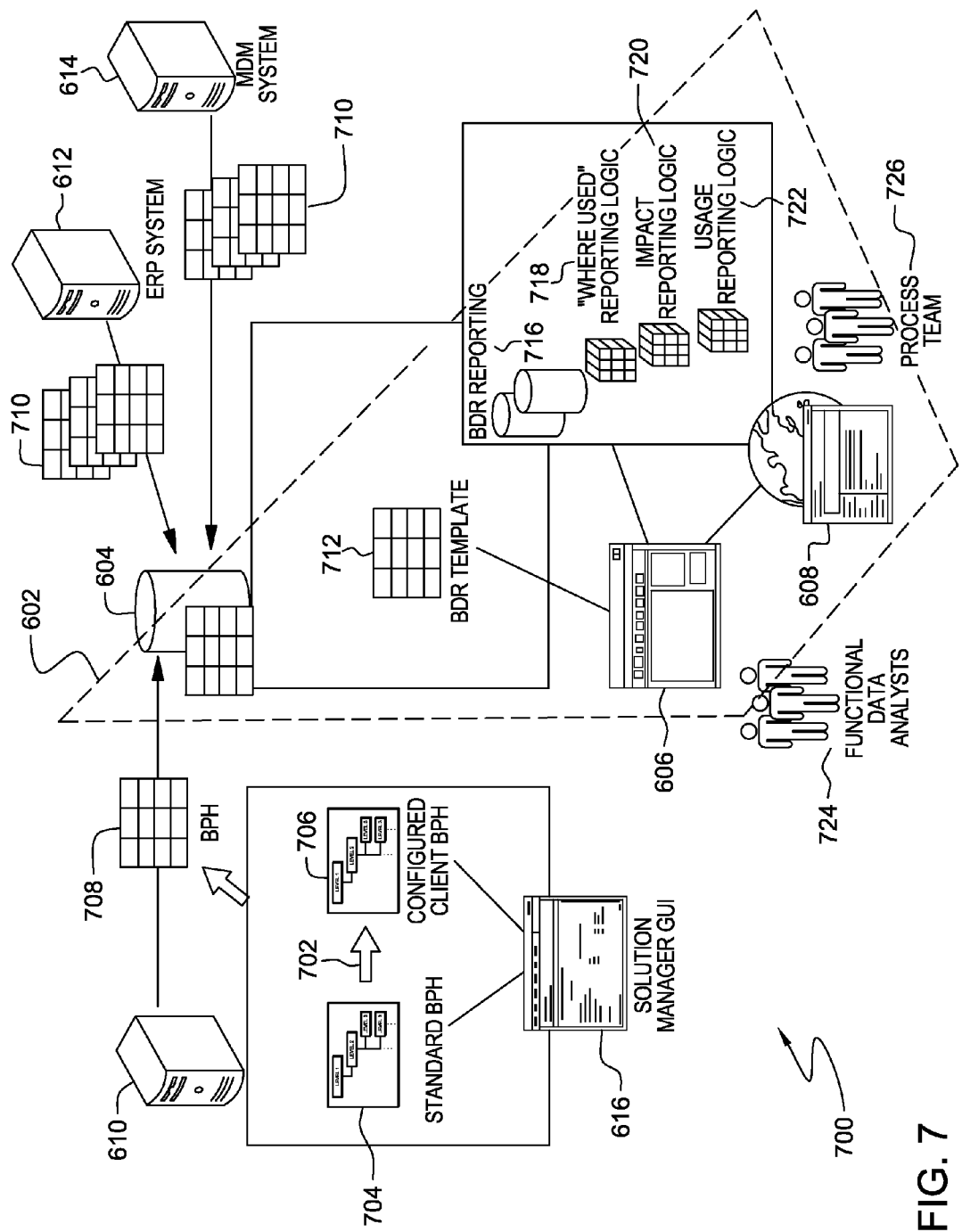
FIG. 7 is a conceptual architecture illustrating an overall exemplary business data roadmap template generation methodology incorporating features of the present invention.

FIG. 2 illustrates a workflow associated with one embodiment of the invention. As previously indicated, during the project preparation phase of a transformation project, the client project personnel builds out their business process hierarchy within the scope of the transformation. After initiator block 201, project personnel, such as FDAs 724, typically make a decision on whether out of the box processes within the SBPH 704 will fill the scope of their project 202. FDAs 724 might be able to visually examine the structure of SBPH 704 by utilizing SBPH representation in SAP® Solution Manager GUI 616, for example, or another ERP module with similar capabilities, as shown in FIG. 7. If out of the box processes within the SBPH 704 are sufficient to fill the scope of the transformation project, the SBPH 704 can be used (block 204) to generate the BDR template 712. Otherwise, SBPH 704 processes can be mapped to similar client-specific processes 206. This step can be done in several ways, such as but not limited to, exploiting metadata. In one embodiment, the system disclosed herein will simultaneously traverse both SBPH 704 and client-specific BPH. Relationships between processes are detected by examining the metadata for the processes within each hierarchy, which describes their business purpose, capabilities and requirements. If the matching metadata is detected the corresponding processes within the SBPH 704 are mapped 702 to client-specific BPH 706. From this mapping, functional objects, such as sales order 408, (described below in conjunction with FIG. 4) are inherited by client processes and with them the technical data elements that pertain to the client ERP technology. In some cases, where relationships between processes are not easily detectable, user input might be required. According to another embodiment of the present invention, the unmapped processes can be presented to the user in GUI 606. This aspect of the present invention allows users to manually complete the mapping process. The client specific BPH 706 will be saved as infrastructure's BPH 708 in persistence component 604 and can be utilized (208) for generating the BDR template 712. Referring back to FIG. 2, in step 210, the process continues with extracting metadata from pre-existing metadata source systems. Pre-existing metadata source systems may include, for instance, an ERP system 612, MDM system 614, Enterprise Information Management (EIM) and similar systems. This step can be done in several ways, such as but not limited to, integrating the present invention with various data integration tools (for example, INFOSPHERE® Information Server, commercially available from International Business Machines Corporation, Armonk, N.Y.). The following exemplary algorithm can be applied during step 210 to extract metadata:

```
for each top-level process
    for each child process
        for each grand-child process
            ... (nested for n-level process hierarchies)
            for each functional object
                for each technical element in the functional
                object
                    extract all attributes and for each attribute:
                    check if backed by lookup table and extract
                    lookup table
                    check foreign-key relationships
                    check constraints on attributes.
```

The metadata extraction process 210 writes the retrieved metadata to a persistence component 604 of infrastructure 602. Persistence component 604 stores the metadata in a logical structure, with consistent metadata content and meaningful relationships between the metadata elements so that it is available to other components, for example, report generator 608. In one exemplary embodiment, metadata, such as complete table definitions for all appropriate tables complete with descriptions, is stored in one or multiple tables within the persistence component depending on a modeling decision made for the persistence component 604. Finally, during step 212, a BDR template 712 is generated, as shown in FIG. 2. It must be noted that the generated BDR template 712 is only the starting point for capturing data requirements by work stream. Project personnel can configure system generated BDR templates 712 further by swapping functional objects, such as sales order 408 and adding or removing technical elements 416 for each process, as discussed below.

Figure 4:
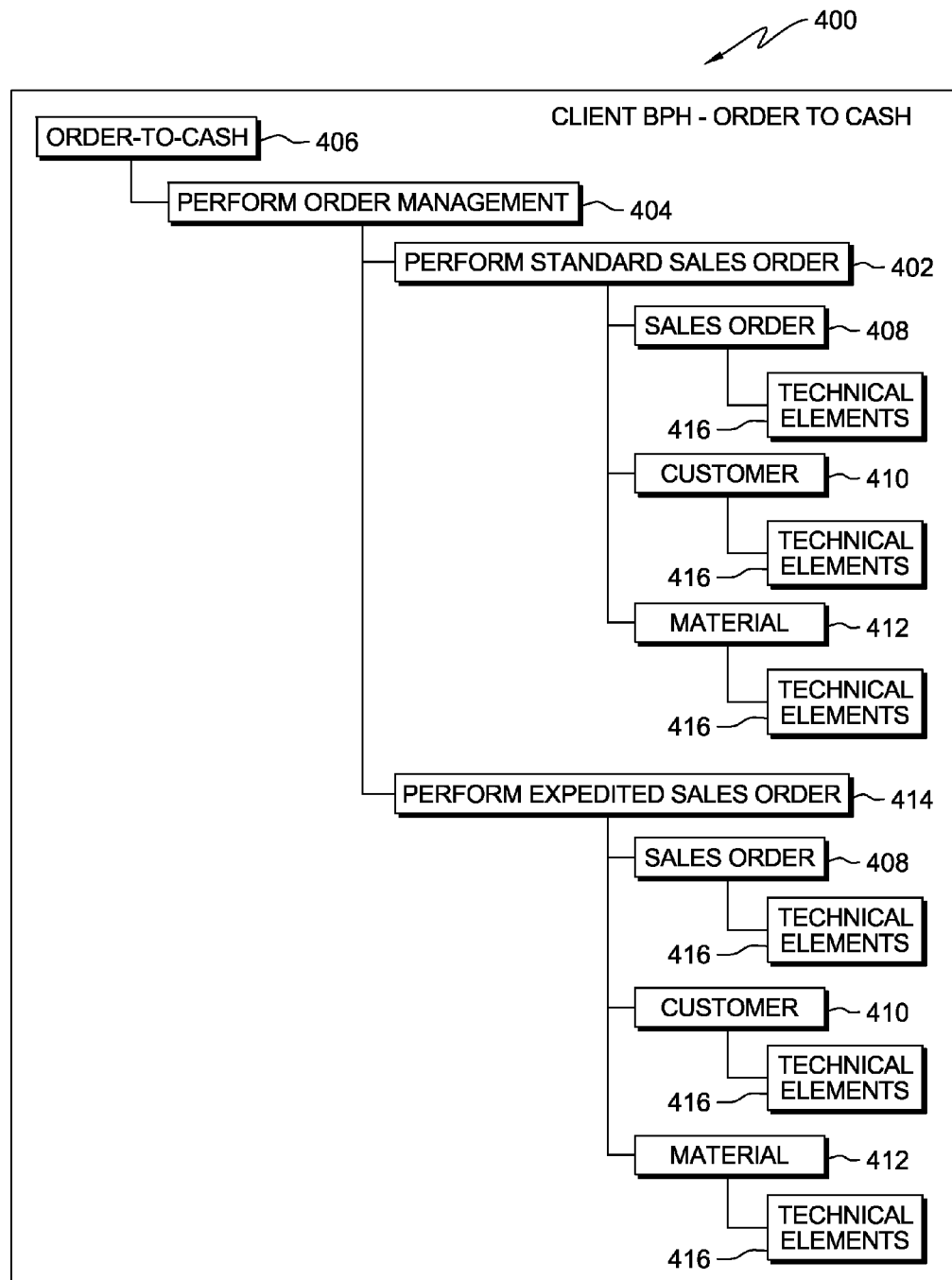
FIG. 4 illustrates an exemplary business process hierarchy with associated functional objects.

FIG. 4 illustrates an exemplary business process hierarchy 400 with associated functional objects, consistent with an embodiment of the invention. As described herein, processes can be modeled in a hierarchy. The business process hierarchy represents the scope of the project through a multi-level process decomposition. A business process is a flow of one or more business activities. A business process when executed accomplishes a specific business objective. FIG. 4 illustrates an exemplary "ORDER-TO-CASH" business process 406. "ORDER-TO-CASH" is a typical business process and refers to the business process for receiving and processing customer sales. It is a top level process in this three level hierarchy. "PERFORM ORDER MANAGEMENT" 404 represents a sub process of "ORDER-TO-CASH" process 406. As discussed herein, typically in a BPH sub processes represent processes to be performed to complete the parent process. "PERFORM ORDER MANAGEMENT" process 404 in turn has 2 sub processes in this example—"PERFORM STANDARD SALES ORDER" 402 and "PERFORM EXPEDITED SALES ORDER" 414. "PERFORM STANDARD SALES ORDER" 402 and "PERFORM EXPEDITED SALES ORDER" 414 represent the lowest level processes in exemplary hierarchy 400 depicted in FIG. 4. "PERFORM STANDARD SALES ORDER" 402 contains three functional objects: "SALES ORDER" 408, "CUSTOMER" 410 and "MATERIAL" 412.

Generally, in order to fulfill the requirements of a specific process, certain functional process requirements are needed. To fulfill the functional requirements a superset of technical elements is needed. The functional objects contain this superset of technical elements. For instance, in order to fulfill the business requirements of "PERFORM STANDARD SALES ORDER" 402 information about sales order, customer, and material might be necessary. In FIG. 4, "PERFORM EXPE- DITED SALES ORDER" process 414 contains the same functional objects: "SALES ORDER" 408, "CUSTOMER" 410 and "MATERIAL" 412. Each functional object contains one or more technical elements 416. "Technical elements" as used here means source of information which pertains to a particular object. For example, the functional object "SALES ORDER" 408 requires information contained in the sales order tables, such as sales header and sales line item tables among others. "Technical elements", as used here, is not limited to, a list of tables. In one exemplary embodiment, technical elements 416 also may contain, but are not limited to, table descriptions, fields, system information, and other metadata. FIG. 4 illustrates that functional objects, for instance 408, serve as a link between technical elements 416 and business processes, specifically 402. In this manner, technical elements 416 are packaged into one or more functional objects across the scope of the business process hierarchy. According to another aspect of this invention, the association between technical elements 416 and functional objects 408, 410, 412 is extracted from the appropriate systems, for example, ERP 612 and MDM 614, and stored in the persistency component 604. The extracted association may constitute, for example, business process definitions, as will be apparent to a person of ordinary skills in the art. It must be noted that the business data model is flexible enough to accommodate any level of BPH, and relates one or more functional objects, such as 408 to any level of the BPH. Moreover, functional objects, such as 408 can belong to more than one sub process.

FIG. 5 illustrates an exemplary table 500 linking technical elements 416 to functional objects 408, 410, 412. In one exemplary embodiment, a table assigning technical elements 416 to functional objects 408 is stored within the persistence component 604. As shown in FIG. 5, the exemplary table 500 may include five columns namely object 502, technical element 504, technical element description, data designation flag and system 506. Herein, the object column 502 represents functional objects, such as "SALES ORDER" 408, "CUSTOMER" 410 and "MATERIAL" 412. Technical element column 504 lists the name of technical element 416, c, a table name. The technical element description column stores a description for each technical element, for instance, a table description. The data designation flag column stores the value of "T" or "M". A technical element with a value of the data designation flag of "T" is a technical element designated as a transaction data. Alternatively, the data designation flag with a value of "M" indicates that a technical element is a master data. Finally, system column 506 stores information about which system the technical element belongs to, for example, SAP® ECC 508. It must be noted that each row in the table 500 links functional objects 408, 410, 412, technical elements 416 and systems that utilize the functional object 508.

FIG. 7 is a conceptual architecture illustrating an overall exemplary BDR template generation methodology 700 incorporating features of the present invention. Elements in FIG. 7 represented by the same reference numerals as in FIG. 6 have the same structure and function as the corresponding elements of FIG. 6 and will not be described here to avoid unnecessary duplication. As shown in FIG. 7, if out of the box processes within the SBPH 704 are insufficient to fill the scope of the transformation project, the SBPH can be mapped 702 to client-specific BPH 706. The client specific BPH 706 will be saved as infrastructure's BPH 708 in persistence component 604 and can be utilized (208) for generating the BDR template 712. Exemplary mapping methodology was discussed above in conjunction with FIG. 2. As previously indicated, once the technical elements 416 with the functional objects 408, 410, 412 have been refined, the present invention provides an appropriate export mechanism for pulling metadata 710 for each technical element listed in table 500 from the appropriate systems, for example, ERP 612 and MDM 614, by utilizing, in an exemplary embodiment, the pre-built integration of middleware solution, such as INFOSPHERE®Data Architect, a product commercially available from International Business Machines Corporation, Armonk, N.Y. As would be apparent to a person of ordinary skills in the art, examples of metadata include, but not limited to, table definitions, field names, data types, primary key indicators, constraints, as well as metadata describing the attributes from a business perspective. This metadata will be utilized by infrastructure 602 to generate BDR templates 712. An exemplary BDR template 712 is discussed further below in conjunction with FIG. 8. FIG. 7 further illustrates report generator component 608, which includes BDR reporting logic 716 necessary to generate various types of reports, such as "where-used" report 718, impact report 720, and usage report 722. These reports are discussed further below in conjunction with FIGS. 9A-9D. FIG. 7 also demonstrates that as the business blueprint phase of the transformation project begins, FDAs 724 can work with other project personnel, such as process teams 726 to further refine technical elements 416 within BDR template 712.

Figure 8:
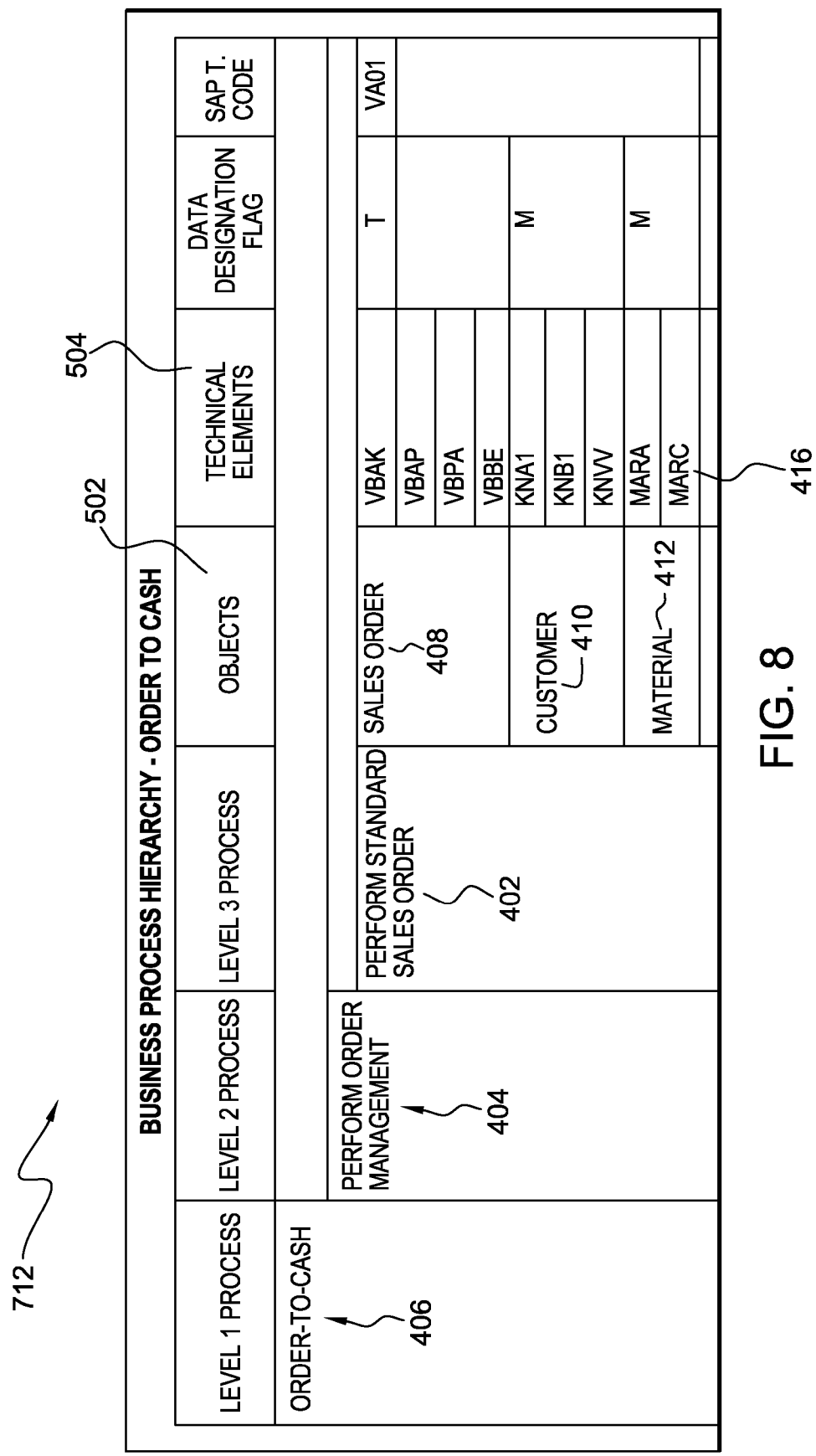
FIG. 8 illustrates an exemplary business data roadmap template.

FIG. 8 depicts an exemplary BDR template 712 as it will be presented to users, such as FDAs 724, through BDR UI component 606. The first three columns show how exemplary BPH 400, illustrated in FIG. 4, might look to the user in generated BDR template 712. It must be noted that each process, specifically, "ORDER-TO-CASH" 406, "PERFORM ORDER MANAGEMENT" 404, and "PERFORM STANDARD SALES ORDER" 402, is depicted as level 1, level 2, and level 3 processes respectively. However, the present invention is not limited to a hierarchy of only three levels. The hierarchy could contain as many levels as required by client-specific needs. In addition, exemplary BDR template 712 may contain functional objects, such as "SALES ORDER" 408, "CUSTOMER" 410 and "MATERIAL" 412. Column 504 shows all technical elements 416 associated with each functional object. BDR template 712 is generated based on table 500 discussed above in conjunction with FIG. 5. FIG. 8 once more demonstrates that functional objects 408, 410, 412 link technical elements 416 to business process hierarchy. In another embodiment, BDR template 712 further includes columns (not shown in FIG. 8) containing all attributes that belong to each technical element 416 depicted in column 504. It must be noted that BDR template 712 is the starting point for capturing data requirements by work stream. Project personnel, such as 724 and 726, can configure BDR template 712 further by, for example, swapping functional objects, such as 408, and adding or removing technical elements 416 for each process. In addition, project teams, during the business blueprint phase, can refine the data requirements at the attribute level by, for example removing attributes that were pulled from the metadata source system but are not within the scope of the project. It must be noted that according to another aspect of this invention FDAs 724 and other users working with BDR templates 712 have an ability to modify functional objects 408, 410, 412 to accommodate client-specific needs. These changes to an object can be global across all sub-processes or local to a particular sub-process. Therefore, the system generated BDR templates 712 allow project personnel to complete specification of data requirements for the transformation project. BDR templates 712 generated by the system presented here, once finalized during the business blueprint phase, will capture a complete specification of data requirements for the transformation project.

Figure 9A:
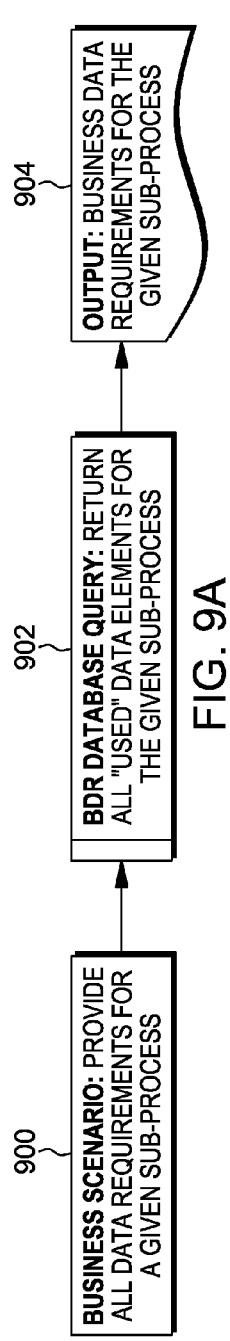
FIGS. 9A-9D are examples of different kinds of reports that can be created by a report generator.
Figure 9B:
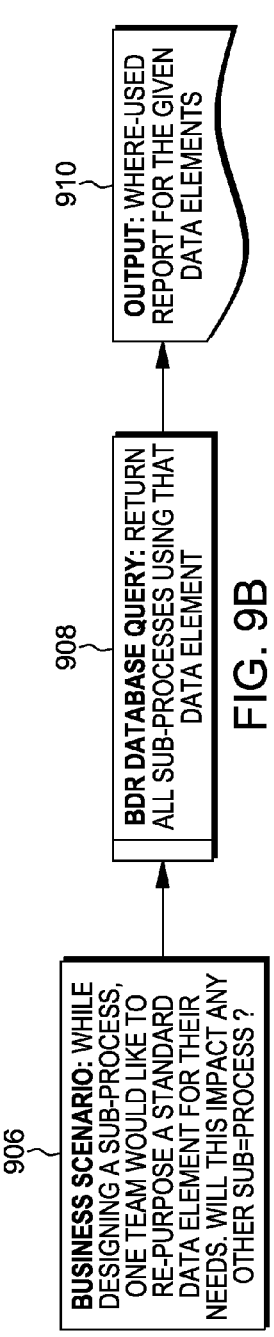
Figure 9C:
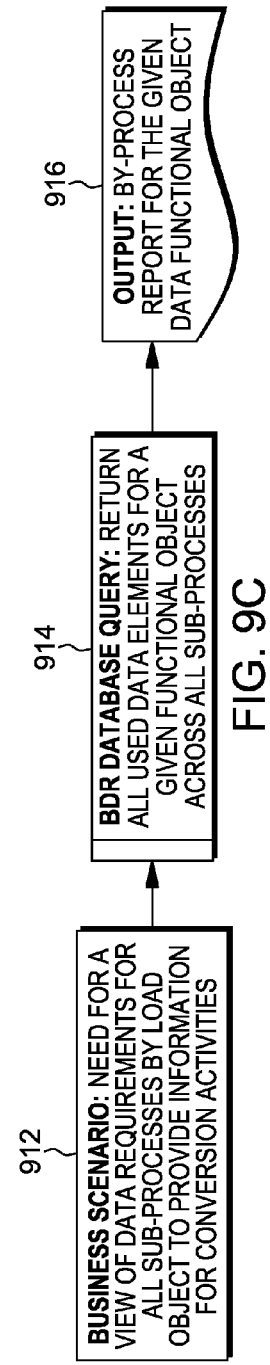
Figure 9D:
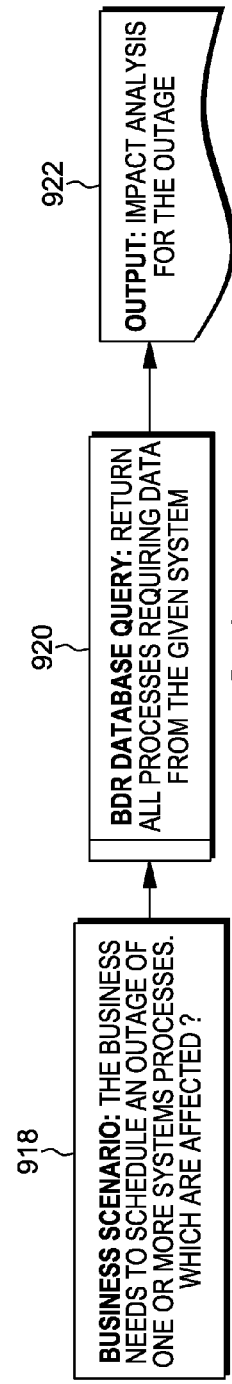

FIGS. 9A-9D demonstrate how exemplary BDR reports can be generated. Reports will be generated by report generator component 608 of infrastructure 602, as shown in FIG. 7. Report generator 608 may generate various reports that will contain, for example, a process-centric view of data. Report generator 608 may use commercial or custom-built reporting tools, or a combination thereof. In one embodiment, as shown in FIG. 9A, in order to provide all data requirements for a given sub process 900, report generator 608 extracts information from a persistence component 604, for example, by issuing database queries. Such query, for example, may request all used technical elements 416 for the given sub-process 902. The generated report will provide business data requirements for the given sub process 904. In the scenario presented in FIG. 9B, one of the process teams 726, while designing a sub-process during the business blueprint phase, would like to rearrange one of the technical elements 416 (shown, for example, in FIG. 8) to accommodate their business process needs. Process team 726 might be interested in knowing whether this modification will impact any other sub processes 906. In this case, report generator 608 will issue another database query, for example, requesting to retrieve all sub processes using that technical element 908. The generated report will contain, for example, all sub processes associated with the given technical element 910. This information is quite valuable when determining impact analysis for technical changes. In yet another scenario depicted in FIG. 9C, process team 726 might need to view data requirements for all sub processes by functional object 408, for example, in order to provide information for conversion activities 912. In this case, report generator 608 will issue yet another database query, for example, requesting to retrieve all used technical elements 416 for a given functional object, for instance 408, across all sub processes 914. The generated report will contain, for example, by process view 916 of technical elements 416 for the given functional object 408. Finally, FIG. 9D illustrates a scenario where there might be a business need to schedule an outage of one or more systems. In that situation it would be beneficial to know which processes might be affected 918. In this case, report generator 608 will issue yet another database query, for example, requesting to return all business processes requiring data from the given system 920. The generated report will contain, in this case, impact analysis for the outage of given system 922.

Report generator 608 may be manually or automatically activated, for instance, periodically or when the project personnel completes business blueprint phase. The project personnel may add, modify, update, or delete report templates to specify the format and content of the generated reports.

Although illustrative embodiments of the present invention have been described herein with reference to the accompanying figures, it is to be understood that the invention is not limited to the embodiments disclosed, but is capable of numerous rearrangements, modifications, and substitutions of parts and elements without departing from the spirit of the invention.

What is claimed is:

1. A computer implemented method for deriving technical data requirements from functional process requirements, the computer implemented method comprising the steps of:
providing a data processing infrastructure, wherein the data processing infrastructure comprises at least one data persistence component and at least one business process hierarchy defining a scope of a business transformation project;
a processor obtaining a plurality of technical elements defining functional process requirements of one or more business process within the at least one business process hierarchy;
the processor classifying the plurality of technical elements into functional objects and linking the classified plurality of technical elements to at least one process within the business process hierarchy;
the processor extracting metadata from at least one metadata source system, wherein the extracted metadata comprises metadata associated with each technical element contained within each functional object;
the processor generating a plurality of user-editable business data roadmap templates based on the extracted metadata, wherein the plurality of user-editable business data roadmap templates defines technical data requirements that are used in the business transformation project;
the processor storing the plurality of user-editable business data roadmap templates in the persistence component; and
wherein the metadata associated with each technical element includes all attributes associated with the technical element, and wherein for each attribute the processor:
determines if the attribute is present in a lookup table and extracts information associated with the attribute from the lookup table;
determines a foreign-key relationship associated with the attribute; and
determines a constraint associated with the attribute.

2. The computer implemented method of claim 1, wherein the data processing infrastructure further comprises a graphical user interface configured to facilitate modification of the plurality of user-editable business data roadmap templates.

3. The computer implemented method of claim 1, wherein the data processing infrastructure further comprises a report generator, wherein the report generator is operative to communicate with the data persistence component and wherein the report generator is adapted for generating a plurality of reports, wherein the plurality of reports provides a process-centric view of data within the business transformation project.

4. The computer implemented method of claim 1, wherein the plurality of technical elements comprises a plurality of tables, table descriptions, table fields, or client-specific system information.

5. The computer implemented method of claim 1, wherein the processor classifying the plurality of technical elements further comprises establishing an association between the plurality of technical elements and the functional objects based on a plurality of business process definitions.

6. A computer system comprising:
a central processing unit (CPU), a computer readable memory, and a computer readable storage medium;
a data processing infrastructure, wherein the data processing infrastructure comprises at least one data persistence component and at least one business process hierarchy defining a scope of a business transformation project;
first program instructions to acquire a plurality of technical elements defining functional process requirements of one or more process within the at least one business process hierarchy;
second program instructions to classify the plurality of technical elements into functional objects and to link the classified plurality of technical elements to at least one process within the business process hierarchy;

third program instructions to extract metadata from at least one metadata source system, wherein the extracted metadata comprises metadata associated with each technical element contained within each functional object;

fourth program instructions to generate a plurality of user-editable business data roadmap templates based on the extracted metadata, wherein the plurality of user-editable business data roadmap templates defines technical data requirements that are used in the business transformation project;

fifth program instructions to store the plurality of user-editable business data roadmap templates in the persistence component; and wherein the first, second, third, fourth and fifth program instructions are stored on the computer readable storage medium for execution by the CPU via the computer readable memory;

wherein the metadata associated with each technical element includes all attributes associated with the technical element, and wherein for each attribute the third or fourth program instructions include instructions to:

determine if the attribute is present in a lookup table, and extract information associated with the attribute from the lookup table;

determine a foreign-key relationship associated with the attribute; and determine a constraint associated with the attribute.

7. The system of claim 6, wherein the data processing infrastructure further comprises a graphical user interface configured to facilitate modification of the plurality of user-editable business data roadmap templates.

8. The system of claim 6, wherein the data processing infrastructure further comprises a report generator, wherein the report generator is operative to communicate with the data persistence component and wherein the report generator is adapted for generating a plurality of reports, wherein the plurality of reports provides a process-centric view of data within the business transformation project.

9. The system of claim 6, wherein the plurality of technical elements comprises a plurality of tables, table descriptions, table fields, or client-specific system information.

10. The system of claim 6, wherein the second program instructions further comprise instructions to establish an association between the plurality of technical elements and the functional objects based on a plurality of business process definitions.

11. The system of claim 6, wherein the data processing infrastructure is pre-configured to communicate with an external enterprise system via at least one middleware component.

12. A computer program product for deriving technical data requirements from functional process requirements, the computer program product comprising: a computer readable storage medium; a data processing infrastructure, wherein the data processing infrastructure comprises at least one data persistence component and at least one business process hierarchy defining a scope of a business transformation project;

first program instructions to acquire a plurality of technical elements defining functional process requirements of one or more process within the at least one business process hierarchy;

second program instructions to classify the plurality of technical elements into functional objects and to link the classified plurality of technical elements to at least one process within the business process hierarchy;

third program instructions to extract metadata from at least one metadata source system, wherein the extracted metadata comprises metadata associated with each technical element contained within each functional object;

fourth program instructions to generate a plurality of user-editable business data roadmap templates based on the extracted metadata, wherein the plurality of user-editable business data roadmap templates defines technical data requirements that are used in the business transformation project; and fifth program instructions to store the plurality of user-editable business data roadmap templates in the persistence component; and wherein the first, second, third, fourth and fifth program instructions are stored on the computer readable storage medium;

wherein the metadata associated with each technical element includes all attributes associated with the technical element, and wherein for each attribute the third or fourth program instructions include instructions to:

determine if the attribute is present in a lookup table, and extract information associated with the attribute from the lookup table;

determine a foreign-key relationship associated with the attribute; and determine a constraint associated with the attribute.

13. The computer product of claim 12, wherein the data processing infrastructure further comprises a graphical user interface configured to facilitate modification of the plurality of user-editable business data roadmap templates.

14. The computer product of claim 12, wherein the data processing infrastructure further comprises a report generator, wherein the report generator is operative to communicate with the data persistence component and wherein the report generator is adapted for generating a plurality of reports, wherein the plurality of reports provides a process-centric view of data within the business transformation project.

15. The computer product of claim 12, wherein the plurality of technical elements comprises a plurality of tables, table descriptions, table fields, or client-specific system information.

16. The computer product of claim 12, wherein the second program instructions further comprise instructions to establish an association between the plurality of technical elements and the functional objects based on a set of business process definitions.

17. The computer implemented method of claim 1, wherein classifying the plurality of technical elements into functional objects comprises storing the classified plurality of technical elements in a table.

18. The system of claim 6, wherein the second program instructions further comprise instructions to store the classified plurality of technical elements in a table.

19. The computer product of claim 12, wherein the second program instructions further comprise instructions to store the classified plurality of technical elements in a table.

* * * * *